United States Patent [19]

Mason et al.

[11] 4,266,817
[45] May 12, 1981

[54] REAR STEP BUMPER

[75] Inventors: James L. Mason, Birmingham; Steve Varjabedian, Southfield, both of Mich.

[73] Assignee: Ford Motor Company, Dearborn, Mich.

[21] Appl. No.: 968,957

[22] Filed: Dec. 13, 1978

[51] Int. Cl.³ .............................................. B60R 27/00
[52] U.S. Cl. .................................. 293/117; 280/164 R
[58] Field of Search ....................... 293/117, 102, 120; 280/164 R, 156, 511, 505

[56] References Cited

U.S. PATENT DOCUMENTS

| | | | |
|---|---|---|---|
| 3,137,516 | 6/1964 | Cline | 280/505 |
| 3,427,062 | 2/1969 | Struber | 293/117 X |
| 3,528,684 | 9/1970 | Cowgill | 280/505 X |
| 3,580,613 | 5/1971 | Northrop | 293/117 |
| 3,682,360 | 8/1972 | Fletcher | 293/117 X |
| 3,774,952 | 11/1973 | Zorn | 293/117 |
| 3,790,200 | 2/1974 | Kalitta | 293/120 |
| 3,905,553 | 10/1975 | Chamberlain | 224/42.03 A |

FOREIGN PATENT DOCUMENTS 1230677  12/1966  Fed. Rep. of Germany ........... 280/505

Primary Examiner—John P. Silverstrim
Assistant Examiner—Norman L. Stack, Jr.
Attorney, Agent, or Firm—John J. Roethel; Clifford L. Sadler

[57] ABSTRACT

A dual-step rear bumper assembly for a truck. The bumper assembly comprises a main or lower crossmember 15 extending the full width of the truck. The crossmember provides the principal bumper strength and also the lower step (16 or 17) of a dual-step feature. To this crossmember 15 is attached an upper crossmember 28 having tread portions providing the upper step 29 or 31 of the dual-step feature. The bumper assembly ends are capped by end bulkheads 41 and 44. Intermediate bulkheads 42 and 43 box in the ends of the license plate cavity located at the center of the bumper assembly. The bulkheads may be of a much lighter gauge metal then the bumper cross members. The bulkheads provide the necessary vertical compression load resistance to support the weight of a person stepping on the upper step portions.

3 Claims, 2 Drawing Figures

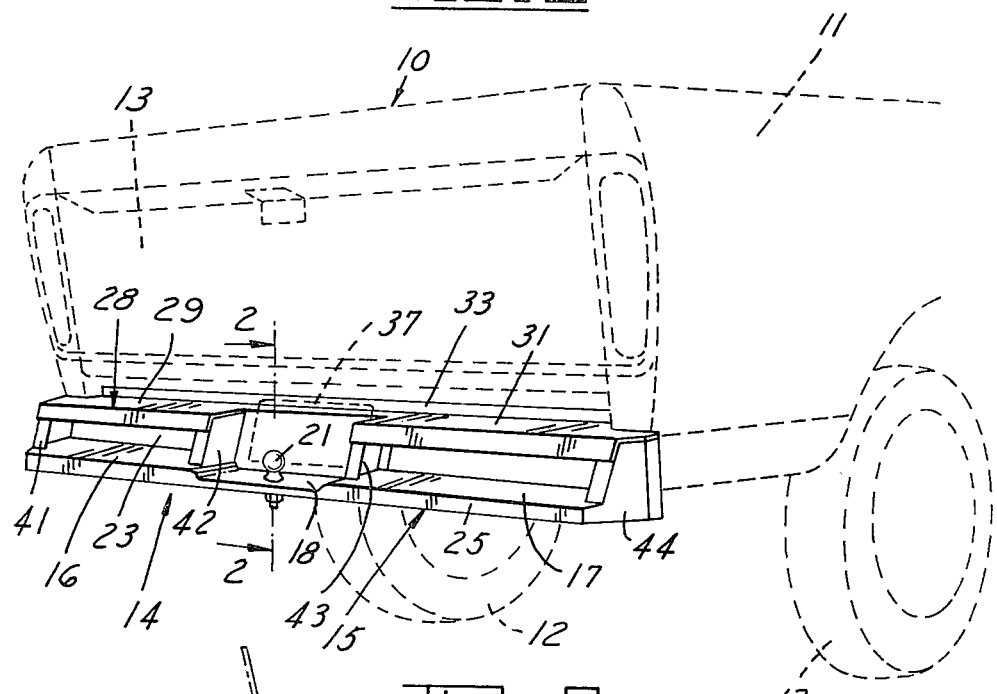
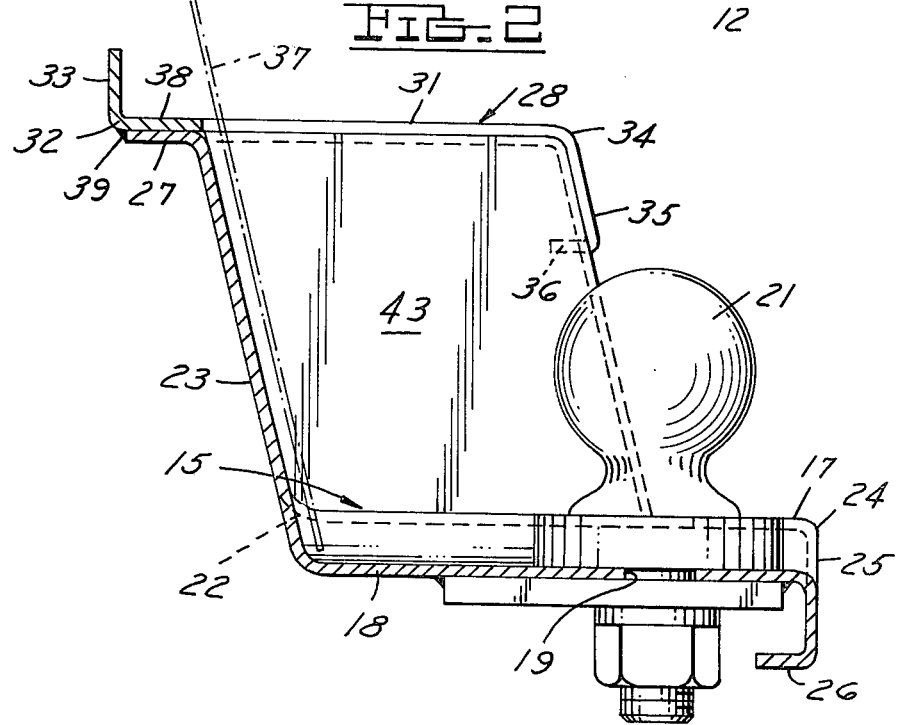

REAR STEP BUMPER

BACKGROUND OF THE INVENTION

This invention pertains to a combination bumper and step for an automotive vehicle, and more particularly, to a rear bumper for a light truck or van-type vehicle.

One of the ways in which automobile and truck manufacturers are attempting to improve the average fuel efficiency of the vehicles is by reducing the weight of the vehicle components. Reduction of vehicle weight permits smaller, more fuel efficient engines to be used to power the vehicle. One area under study has been the bumpers which conventionally are made of heavy guage steel. It has been proposed that the bumpers be fabricated of aluminum or plastic material, both of which permit a weight and cost saving over the types of steel conventionally used in bumper fabrication. Bumpers made of aluminum or plastic, however, present fabrication difficulties, and also have met consumer resistance as being of questionable durability and damageability.

Rear bumpers for light trucks and van-type vehicles, in particular, present even greater fabrication difficulties than the ordinary bumper since it is desirable that a step portion be incorporated in the bumper structure to facilitate ingress and egress to the cargo area of the truck or van.

The current availability of high strength, low alloy steels having the formability characteristics of mild steels now presents the opportunity to greatly reduce the guage and thereby the weight of the metal used in a rear step bumper at only a slight cost penalty over the use of aluminum.

An investigation of the prior art has developed the following patents showing various rear step bumpers, none of which, however, disclose the specific structure of the present invention. U.S. Pat. Nos. 3,427,062 issued Feb. 11, 1969 to F. L. Struben for an "Aluminum Bumper with Horizontal Step Portion"; 3,774,952 issued Nov. 27, 1973 to E. Zorn for an "Aluminum Bumper Construction"; 3,790,200 issued Feb. 5, 1971 to C. L. Kalitta for a "Vehicle Bumper"; and 3,905,527 issued Sept. 16, 1975 to P. N. Chamberlain for a "Bumper for Camper Support Vehicles".

SUMMARY OF THE INVENTION

The present invention relates to a dual-step rear bumper assembly for a truck. The bumper assembly comprises an elongated lower integrally continuous crossmember, the length of which extends the full width of the bumper assembly. The lower crossmember has two step portions separated by a depressed central portion. The lower cross member also has at one longitudinal edge closest to the rear end of the truck an integral upstanding kick plate flange extending substantially the full length of the crossmember and having at its other longitudinal edge a down-turned flange means, the two flanges coacting to provide longitudinal rigidity to the crossmember.

The bumper assembly has an upper crossmember having step portions paralleling and overlying in spaced vertical relationship the step portions of the lower crossmember. The upper crossmember step portions have a longitudinal space therebetween overlying the central portion of the lower crossmember to provide a visibility opening for a vehicle license plate mounted on the kick plate flange. The upper step portions at one longitudinal edge are supported on the upper edge of the lower crossmember kick plate flange. A plurality of vertical bulkheads extend between the upper and lower crossmembers for maintaining the two in spaced relationship under vertical loading applied to any of the lower or upper step portions.

BRIEF DESCRIPTION OF THE DRAWING

The objects, advantages and features of the present invention will be made more apparent as this description proceeds, particularly when considered in connection with the accompanying drawing, wherein:

FIG. 1 is a fragmentary perspective view of the rear end of a light truck having the dual-step rear bumper assembly embodying the present invention mounted thereon; and FIG. 2 is a sectional view taken on the line 2—2 of FIG. 1.

DETAILED DESCRIPTION OF THE INVENTION

Referring now to the drawing, FIG. 1 shows the rear end of a pickup truck, generally designated 10, having a cargo box 11 located above the rear road wheels 12. Below and extending rearwardly of the tailgate 13 of the cargo box 11 is the dual-step bumper assembly, generally designated 14, embodying the present invention.

The dual-step rear bumper assembly 14 comprises an elongated lower integrally continuous crossmember 15 that for maximum strength and minimum steel weight preferably is formed of high strength, low alloy steel. The lower crossmember 15 has step portions 16 and 17 separated by a depressed center portion 18 apertured at 19 to receive a trailer hitch ball 21. The lower crossmember 15 is formed at one longitudinal edge 22, the left edge as viewed in FIG. 2 and the edge nearest the truck body or frame, with a slightly inclined kick plate flange 23. At its other edge 24, the right edge as viewed in FIG. 2 and the edge furthest away from the truck body or frame, the crossmember 15 is formed with a downwardly turned flange 25 having a reverse lift 26 turned underneath the crossmember. The kick plate flange 23 terminates at its upper edge in a lip flange 27 turned away from and substantially paralleling the plane of the lower crossmember 15. The edge flanges 23 and 25, being formed integrally with the crossmember 15, reinforce and coact to provide longitudinal rigidity to the crossmember 15.

The dual-step bumper assembly 14 has an upper crossmember 28 having two step portions 29 and 31 that parallel and overlie the lower crossmember step portions 16 and 17. Each step portion 29 and 31 preferably has a tread plate or non-skid surface. As viewed in FIG. 2, along its left edge 32 the upper crossmember 28 has a relatively short upwardly turned flange 33, and along the right edge 34 of each step portion a downwardly turned flange 35 having an inwardly turned lip flange 36.

Step portions 29 and 31 have a longitudinal space therebetween overlying the depressed central portion 18 of the lower crossmember 15. This provides a cavity and visibility opening for a vehicle license plate 37 that may be mounted on the kick plate flange 23 of the lower crossmember 15.

The left marginal edge portion 38 of the upper crossmember 28 overlies the lip flange 27 of the kick plate flange 23 of the lower crossmember 15 and is fastened thereto, as by welding, as indicated at 39 in FIG. 2. In effect, the step portions 29 and 31 of the upper crossmember 28 are cantilevered over the step portions 16 and 17, respectively, of the lower crossmember 15. A plurality of bulkheads 41, 42, 43 and 44 are interposed between the upper and lower step portions, as best seen in FIG. 1. The bulkheads are channel-shaped pieces with the two end pieces 41 and 44 capping the ends of the bumper assembly 14, and the two inner pieces 42 and 43 extending between the inner edge portions of the upper and lower step portions of the crossmembers. These vertical bulkheads are welded in place and act as tension members when weight is put on a lower step portion and as compression members when weight is placed on an upper step portion.

The object of the present invention was to develop a steel step bumper that would approach the weight of the same bumper fabricated out of aluminum and at a cost not to exceed that of a conventional steel step bumper of the type used on recent model light trucks. A bumper constructed in accordance with the present invention fabricated out of mild steel as calculated to have a weight of 42 pounds. This would be 22 pounds lighter than a current production step bumper having the same general dimensions and only ten pounds heavier than an equivalent aluminum bumper. The weight of the same bumper made of high strength, low alloy steel would drop to 35 pounds, only five pounds over the weight of an aluminum bumper. The type of construction embodying the present invention if fabricated from high strength, low alloy steel would possibly cost more than the cost of the current production steel bumper, but it would not approach the high cost of an equivalent aluminum bumper.

It is to be understood this invention is not limited to the exact construction illustrated and described above, but that various changes and modifications may be made without departing from the spirit and scope of the invention.

We claim:

1. A dual-step rear bumper assembly adapted to be mounted on the rear end of a truck frame below the level of a cargo carrying box supported on the latter, comprising:

an elongated lower integrally continuous crossmember the length of which extends the full width of the bumper assembly, the lower crossmember having a depressed central portion delimiting lower step portions at each end thereof, the lower crossmember having along its longitudinal edge closest to the rear end of the truck frame an integral upstanding kick plate flange extening substantially the full length of the crossmember and having at its longitudinal edge furthest away from the truck frame a down-turned flange means, the two flanges coacting to provide longitudinal rigidity to the lower crossmember, an upper crossmember providing upper step portions paralleling and overlying in fixed spaced vertical relationship the lower step portions on the lower crossmember, the upper crossmember step portions having a longitudinal space therebetween overlying the central portion of the lower crossmember to provide a visibility opening for a vehicle license plate mounted on the kick plate flange, the upper crossmember at one longitudinal edge being supported on the upper edge of the lower crossmember kick plate flange, and a plurality of vertical bulkheads between the upper and lower crossmembers for maintaining the two in spaced relationship under vertical load applied to any of the lower or upper step portions.

2. A dual-step rear bumper assembly according to claim 1, in which:

the kick plate flange terminates at its upper edge in a lip flange turned away from and substantially paralleling the lower crossmember, the upper crossmember step portions being fastened to the lip flange and being cantilevered over the lower crossmember step portions.

3. A dual-step rear bumper assembly according to claims 1 or 2, in which:

the vertical bulkheads cap the ends of the bumper assembly and box in the ends of the license plate visibility opening.

* * * * *